United States Patent
Iizaka et al.

(10) Patent No.: US 10,748,388 B2
(45) Date of Patent: Aug. 18, 2020

(54) SALES DATA PROCESSING APPARATUS

(71) Applicant: TOSHIBA TEC KABUSHIKI KAISHA, Tokyo (JP)

(72) Inventors: Hitoshi Iizaka, Fuji Shizuoka (JP); Hidehiro Naito, Mishima Shizuoka (JP); Shinsuke Yajima, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/291,353

(22) Filed: Mar. 4, 2019

(65) Prior Publication Data

US 2019/0272713 A1 Sep. 5, 2019

(30) Foreign Application Priority Data

Mar. 5, 2018 (JP) ................... 2018-038863

(51) Int. Cl.
  *G06K 15/00* (2006.01)
  *G07G 1/00* (2006.01)
  (Continued)

(52) U.S. Cl.
  CPC .......... *G07G 1/0018* (2013.01); *A47B 47/00* (2013.01); *A47F 9/046* (2013.01); *G06Q 20/20* (2013.01);
  (Continued)

(58) Field of Classification Search
  CPC ....... A47B 47/00; A47F 9/046; G07G 1/0018; G07G 1/01; G07G 1/0045; G07G 5/00; G06Q 20/20
  See application file for complete search history.

(56) References Cited

U.S. PATENT DOCUMENTS 5,941,618 A * 8/1999 Cheng ................ G07G 1/0018
                                                     312/223.2
2009/0210309 A1* 8/2009 Lum ..................... G06Q 20/20
                                                     705/17
(Continued)

FOREIGN PATENT DOCUMENTS

EP       2905736 A1   8/2015
EP       3147849 A1   3/2017
JP    2010257120 A   11/2010

OTHER PUBLICATIONS

Extended European Search Report dated May 27, 2019, mailed in counterpart European Application No. 19160509.6, 7 pages.

*Primary Examiner* — Thien M Le
(74) *Attorney, Agent, or Firm* — Kim & Stewart LLP

(57) ABSTRACT

A sales-data processing apparatus comprises a main body section of a columnar shape. A reader is in the main body section and configured to read information for identifying a commodity in a sales transaction. An operator display is directed to an operator side of the main body section. A customer display, adjacent the operator display section, is directed to a customer side of the main body section. An input device is provided for receiving input operations related settlement processing from a customer on the customer side of the main body section. The input device is positioned adjacent to the customer display. A supporting section is attached to the main body section to support the input device at the position substantially adjacent to the customer display.

20 Claims, 5 Drawing Sheets

(51) Int. Cl.

| | | |
|---|---|---|
| *A47B 47/00* | (2006.01) | |
| *A47F 9/04* | (2006.01) | |
| *G07G 1/01* | (2006.01) | |
| *G07G 5/00* | (2006.01) | |
| *G06Q 20/20* | (2012.01) | |

(52) U.S. Cl.
CPC ............ *G07G 1/0045* (2013.01); *G07G 1/01* (2013.01); *G07G 5/00* (2013.01)

(56) References Cited

U.S. PATENT DOCUMENTS

| | | | |
|---|---|---|---|
| 2010/0127077 A1* | 5/2010 | Ueda | G07F 9/02 |
| | | | 235/383 |
| 2011/0068163 A1* | 3/2011 | Scott | G07G 1/0018 |
| | | | 235/3 |
| 2012/0193407 A1* | 8/2012 | Barten | A47F 9/046 |
| | | | 235/375 |
| 2015/0220899 A1 | 8/2015 | Namura et al. | |
| 2015/0227907 A1 | 8/2015 | Urushibata et al. | |
| 2017/0076269 A1* | 3/2017 | Saeed | G06Q 20/3224 |
| 2017/0076559 A1* | 3/2017 | Osmon | G07G 1/0027 |
| 2017/0091797 A1 | 3/2017 | Nodera | |
| 2017/0345263 A1 | 11/2017 | Gotanda | |
| 2019/0290126 A1* | 9/2019 | Katz | A61B 3/024 |

\* cited by examiner

SALES DATA PROCESSING APPARATUS

CROSS-REFERENCE TO RELATED APPLICATION

This application is based upon and claims the benefit of priority from Japanese Patent Application No. 2018-038863, filed in Mar. 5, 2018, the entire contents of which are incorporated herein by reference.

FIELD

An embodiment described herein relates generally to a sales-data processing apparatus.

BACKGROUND

There is a checkout system in which a sales-data processing apparatus that performs registration of items in a sales transaction and an accounting apparatus that executes settlement processing on the basis of sales transaction data from the sales-data processing apparatus are connected by a network. In such a checkout system, a configuration in which a plurality of store clerks divide the labor of registration and settlement (a two-person work type) and a configuration in which a customer performs the settlement (a semi-self service type) can be adopted.

In such a checkout system, a sales-data processing apparatus of a vertical scanner type is generally used. Such a sales-data processing apparatus is mounted on a checkout counter. The sales-data processing apparatus includes a reading device that reads a barcode or the like attached to a commodity and a display device. A peripheral device such as a PIN pad device for use by a customer to input a code number during credit/debit card settlement is connected to the sales-data processing apparatus. Since such a peripheral device is separate from the sales-data processing apparatus, the peripheral device is typically placed on the checkout counter at a position adjacent to the sales-data processing apparatus.

However, if the peripheral device is placed on the checkout counter, a usable region of the checkout counter is reduced. Therefore, operational convenience is likely to be deteriorated, for example, a shopping basket cannot be placed near the sales-data processing apparatus due to the presence of the peripheral device. Additionally, the height of the checkout counter is generally lower than the waist height of an average adult female. However, it is considered somewhat difficult to operate a PIN pad at this height level.

DETAILED DESCRIPTION

In general, according to one embodiment, a sales-data processing apparatus includes a main body section of a columnar shape. A reader is in the main body section and configured to read information for identifying a commodity in a sales transaction. An operator display is directed to an operator side of the main body section. A customer display, adjacent the operator display section, is directed to a customer side of the main body section. An input device is configured to receive input operations related settlement processing of the sales transaction from a customer on the customer side of the main body section. The input device is at a position substantially adjacent to the customer display. A supporting section is attached to the main body section and configured to support the input device at the position substantially adjacent to the customer display.

A sales-data processing apparatus according to an embodiment is explained below with reference to the accompanying drawings. In the embodiment explained below, an example is explained in which the embodiment is applied to a sales-data processing apparatus used in checkout systems of a two-person work type, a semi-self service type, and the like. However, the present disclosure is not limited to this example.

Figure 1:
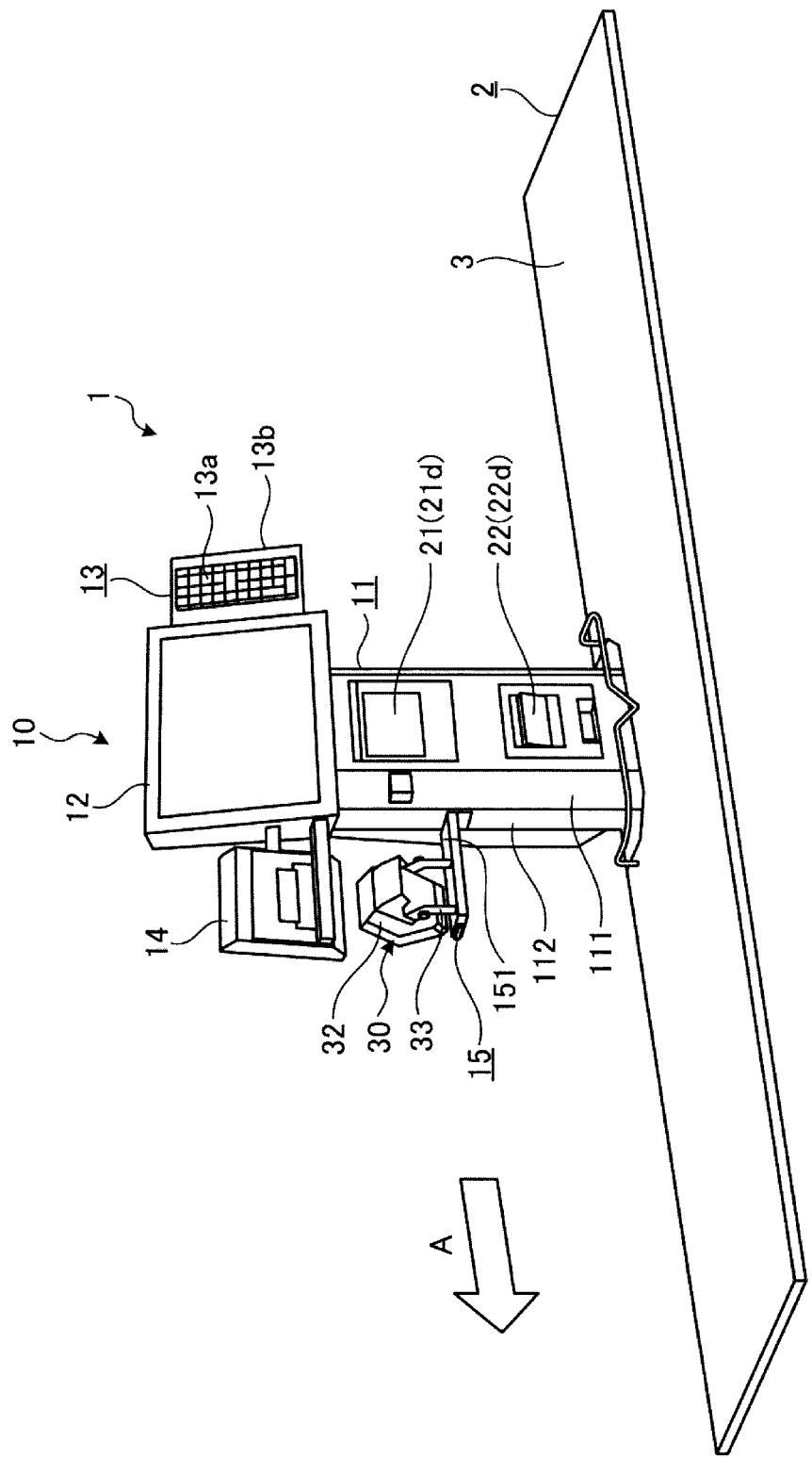
FIG. 1 is a perspective view illustrating a checkout system according to an embodiment.

FIG. 1 is a perspective view illustrating an example of a checkout system 1 according to an embodiment. The checkout system 1 includes a checkout counter 2 (also referred to as a table in some contexts) having a generally a rectangular table shape. A flat loading surface 3 is formed on the upper surface of the checkout counter 2. A shopping basket or the like that stores commodities can be placed on the loading surface 3.

A sales-data processing apparatus 10 is substantially centered in the longitudinal direction of the checkout counter 2. The sales-data processing apparatus 10 is a vertical-type scanner apparatus (also referred to a vertical scanner). The sales-data processing apparatus 10 is located on the far side the loading surface 3 as viewed from an operator side of the checkout counter 2. The sales-data processing apparatus 10 is communicably connected to an external apparatus such as a settlement terminal (not illustrated in FIG. 1).

The sales-data processing apparatus 10 includes a main body section 11, a display section 12, an operation section 13, a customer display section 14, and an arm section 15.

The main body section 11 has a columnar shape and is fixed to the loading surface 3. The main body section 11 includes a housing section 111 and a support section 112.

The housing section 111 has a substantially box-like shape and incorporates various devices related to the operation of the sales-data processing apparatus 10 on the inside. The various devices are, for example, a scanner section 21 and a printer section 22.

The scanner section 21 is an example of a reading section. The scanner section 21 reads information for identifying a commodity (e.g., a code symbol attached to the commodity or a visual characteristic of the commodity) via a reading window 21a. The scanner section 21 includes a light that emits reading light from the reading window 21a, an image sensor that receives reflected light of the reading light, and a decoder that executes decode processing concerning an output signal of the image sensor.

The printer section 22 is a printer device that discharges (issues) a printout such as a receipt from a paper discharge port 22a. The printer section 22 includes a paper storing section for storing paper, a conveying section that conveys the paper stored in the paper storing section to the paper discharge port 22a, and a printer section that performs printing on the paper.

The reading window 21a of the scanner section 21 and the front surface of the printer section 22 form a part of a front surface of the housing section 111 on a side facing to the operator. That is, the housing section 111 includes, on the front surface, an opening for the reading window 21a and the paper discharge port 22a of the printer section 22.

The support section 112 surrounds and supports the periphery excluding the front surface section of the housing section 111. The support section 112 includes a pair of foot sections at the lower end. The pair of foot sections are formed by extending both side portions of the main body section 11 downward. This pair of foot sections is inserted into a pair of through-holes provided in the loading surface 3. The main body section 11 is fixed on the loading surface 3 by the insertion of the foot sections.

The housing section 111 and the support section 112 configuring the main body section 11 have a doubled structure at least on both side portions. The double structure is, for example, a structure in which metal plates are opposed to each other with a predetermined gap therebetween. This doubled structure enables a cable to be drawn and housed between the opposed plates. Since a cable is housed in the gap between the metal plates, it is possible to reduce exposed cable portions on the loading surface 3 and the like. Additionally, the doubled structure improves the strength of the main body section 11.

The display section 12 is attached to the upper surface of the housing section 111 (e.g., the top of the main body section 11). The operation section 13 is attached to a side of the display section 12. Since the display section 12 and the operation section 13 have the configurations explained above, when the operation section 13 is pressed, a torsional force is generated in the main body section 11. However, in the sales-data processing apparatus 10 of this embodiment, since the support section 112 supports the housing section 111 from both side surfaces, the housing section 111 has high rigidity against torsional forces. Occurrence of a shake and a wobble associated with the pressing of the operation section 13 can be prevented. With the configuration explained above, since the rigidity of the housing section 111 itself is improved, even if a heavy object such as the display section 12 is attached on the housing section 111, shake and wobble is prevented. Satisfactory stability can be obtained in the mounting to the loading surface 3.

The display section 12 is, for example, a display device such as a liquid crystal display and is configured to be capable of tilting. The display section 12 is used as a display for the operator of the sales-data processing apparatus 10. The display section 12 displays information for the operator. The display section 12 may be configured as a touch panel. The display section 12 may include control units (computer components) such as a CPU (Central Processing Unit) that controls the operation of the sales-data processing apparatus 10, a ROM (Read Only Memory), and a RAM (Random Access Memory).

The operation section 13 is provided adjacent to the display section 12. In the example illustrated in FIG. 1, the operation section 13 is provided on the right of the display section 12 when viewed from the operator. The operation section 13 includes input devices such as a keypad 13a and a card reader. The card reader reads a magnetic stripe attached to a card or the like. The operation section 13 includes a groove 13b, which is a part of the card reader. The grove 13b receives insertion of the magnetic stripe portion of the card. When the card is slid along the longitudinal direction of the groove 13b, the card reader reads information of the magnetic stripe.

The customer display section 14 is provided adjacent to the display section 12. In the example illustrated in FIG. 1, the customer display section 14 is disposed on the left side of the display section 12 when viewed from the operator. The customer display section 14 is a display device such as a liquid crystal display. The customer display section 14 displays information for a customer behind the display section 12. Examples of the information for the customer include information concerning a bargain sale besides information concerning a commodity read by the scanner section 21 and a list of registered commodities.

The arm section 15 is attached to a side of the main body section 11 and horizontally extends away the main body section 11. More particularly, the arm section 15 is fixed to the support section 112 of the main body section 11 by screws or the like. The arm section 15 is located in a position separated in an upward direction from the loading surface 3. The arm section 15 in this embodiment is located between the customer display section 14 and a placement surface 151.

Figure 2:
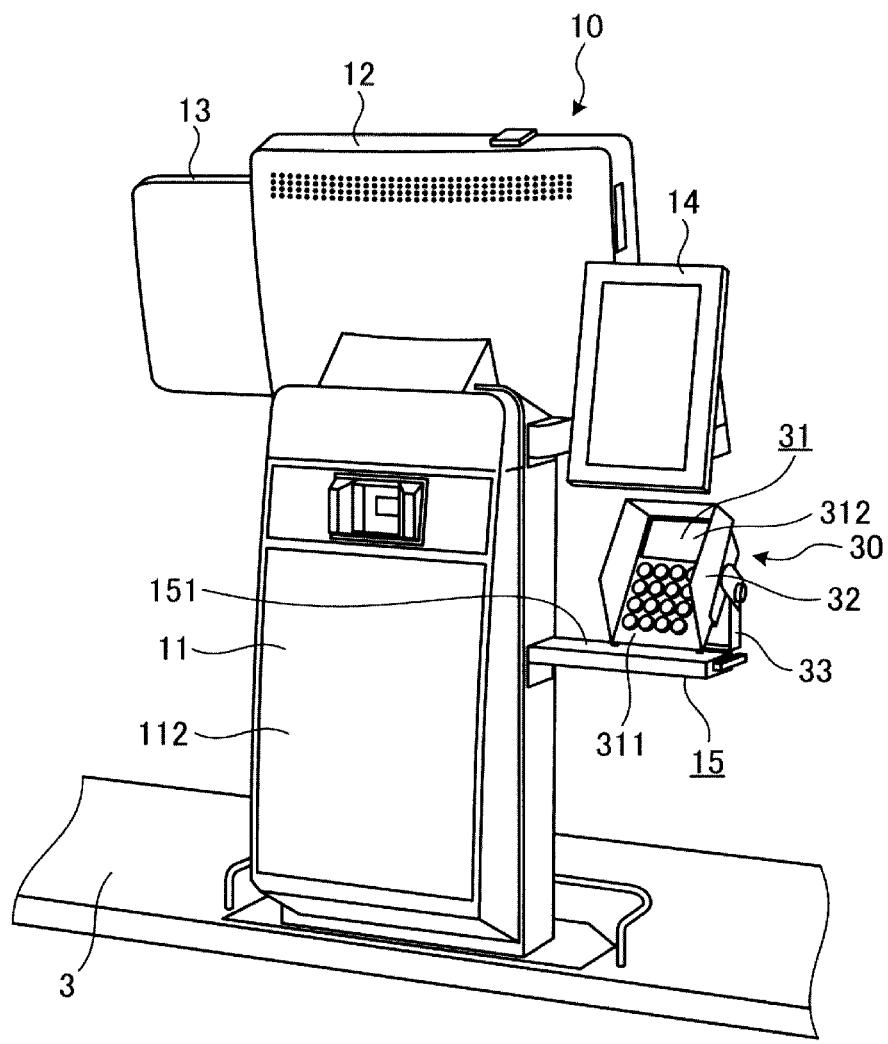
FIG. 2 is a back-side view of a sales-data processing apparatus according to an embodiment.

A PIN (Personal Identification Number) pad device 30 is disposed on a placement surface 151 of the arm section 15. Whereas FIG. 1 is a figure of the sales-data processing apparatus 10 viewed from the front side (the operator side), FIG. 2 is a perspective view of the sales-data processing apparatus 10 viewed from the back side (the customer side).

The arm section 15 is an example of a supporting section that supports an input device or peripheral device and positions the device around the customer display section 14. The input or peripheral device is, for example, the PIN pad device 30.

The PIN pad device 30 is placed on the placement surface 151 at a height between the customer display section 14 and the loading surface 3. The PIN pad device 30 in this embodiment is disposed at a height below the customer display section 14.

The PIN pad device 30 is disposed near but not overlapping the customer display section 14. That is, in the rear view (or the front view) of the sales-data processing apparatus 10, an upper part of the PIN pad device 30 and a lower part of the customer display section 14 do not overlap, but a very small gap is left between the upper part of the PIN pad device 30 and the lower part of the customer display section 14.

The PIN pad device 30 is an example of an input device that receives input operations of the customer related to settlement processing. More specifically, the PIN pad device 30 is used during card settlement by a credit card or the like. The PIN pad device 30 receives an input of a code number or the like.

The PIN pad device 30 includes a main body 31, a cover 32, and a holder 33. The main body 31 includes an operation section 311 and a display section 312. The PIN pad device 30 is disposed with the operation section 311 and the display section 312 directed to the customer side.

The operation section 311 receives an input of a code number by the customer. The display section 312 displays guidance or the like for the customer with characters or the like. The cover 32 surrounds the main body 31 to hide operation performed by the customer on the operation section 311 and displayed content on the display section 312 from people other than the customer and prevent the operations and the displayed content from being easily seen by other people. The holder 33 supports the main body 31 such that the operation section 311 and the display section 312 are inclined at a predetermined angle and fixes the main body 31 to the placement surface 151 of the arm section 15. As the predetermined angle, an angle that can be assumed to allow the customer to easily operate the operation section 311 and see the display section 312 is suitable.

An arrow A illustrated in FIG. 1 indicates a movement direction of the customer. The customer display section 14 and the PIN pad device 30 are disposed on downstream of the main body section 11. Consequently, it is possible to guide the customer to the downstream side of the sales-data processing apparatus 10, to facilitate movement of customers and prevent congestion.

Figure 3:
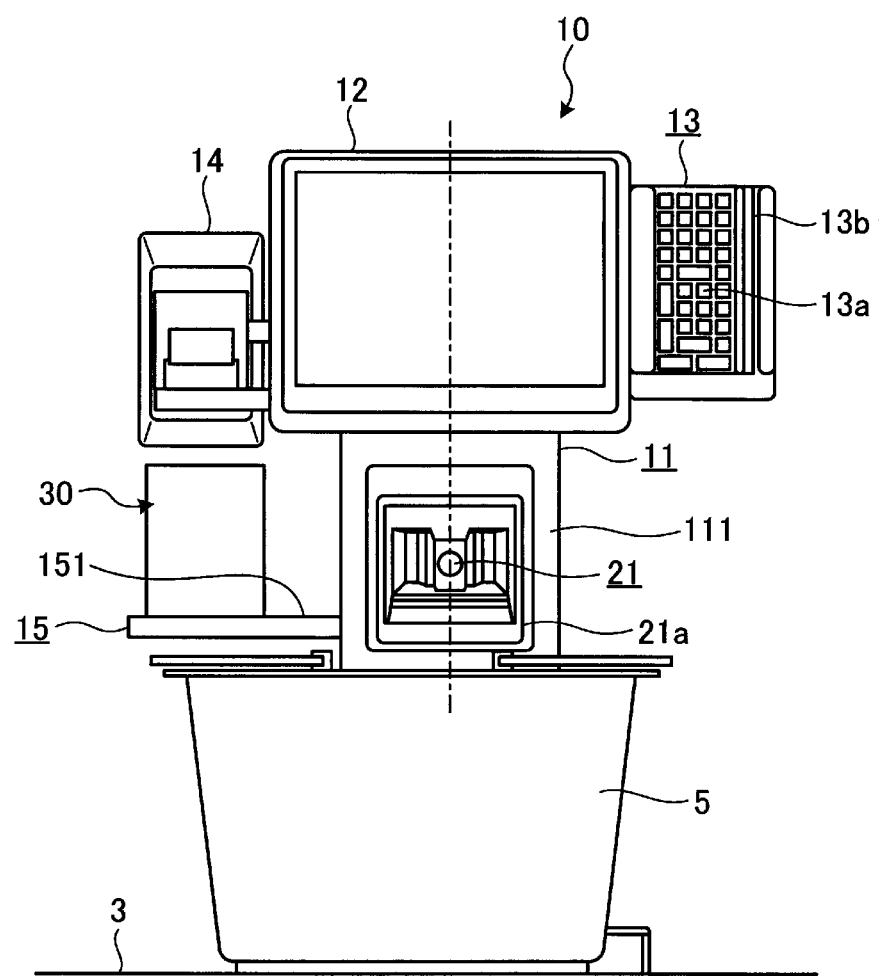
FIG. 3 is a front view of a sales-data processing apparatus depicting a state in which a shopping basket is in front of a main body section.
Figure 4:
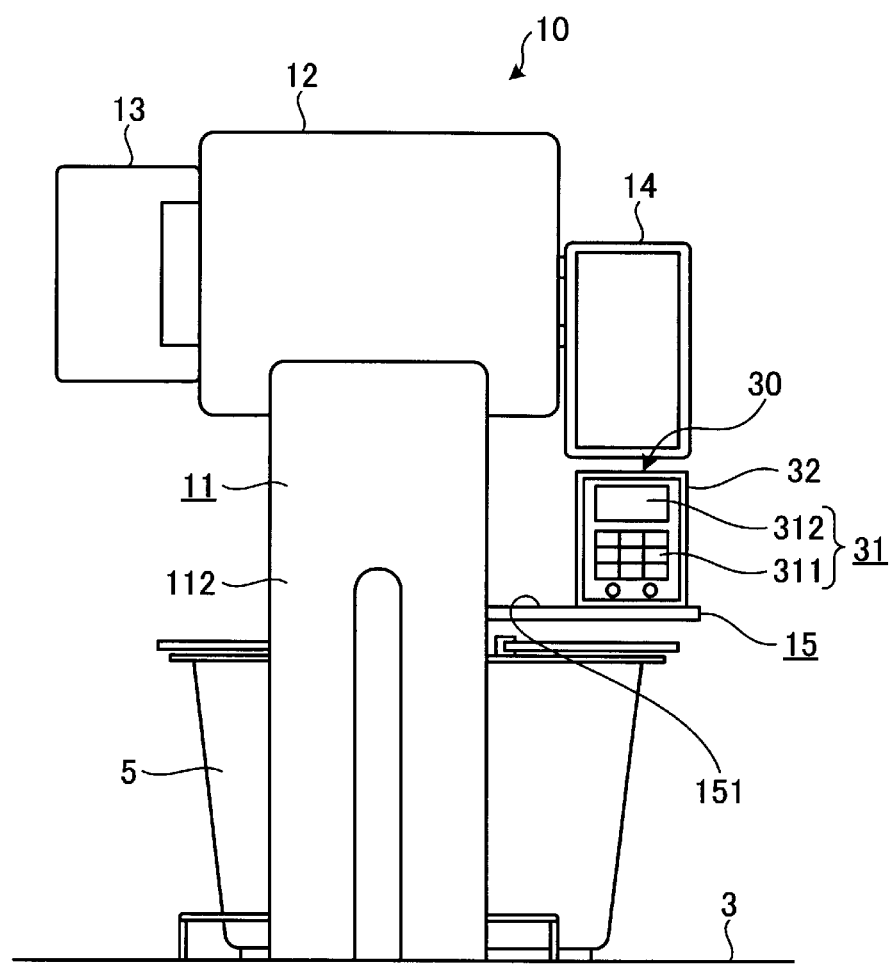
FIG. 4 is a rear view of a sales-data processing apparatus depicting a state in which a shopping basket is in front of the main body section.
Figure 5:
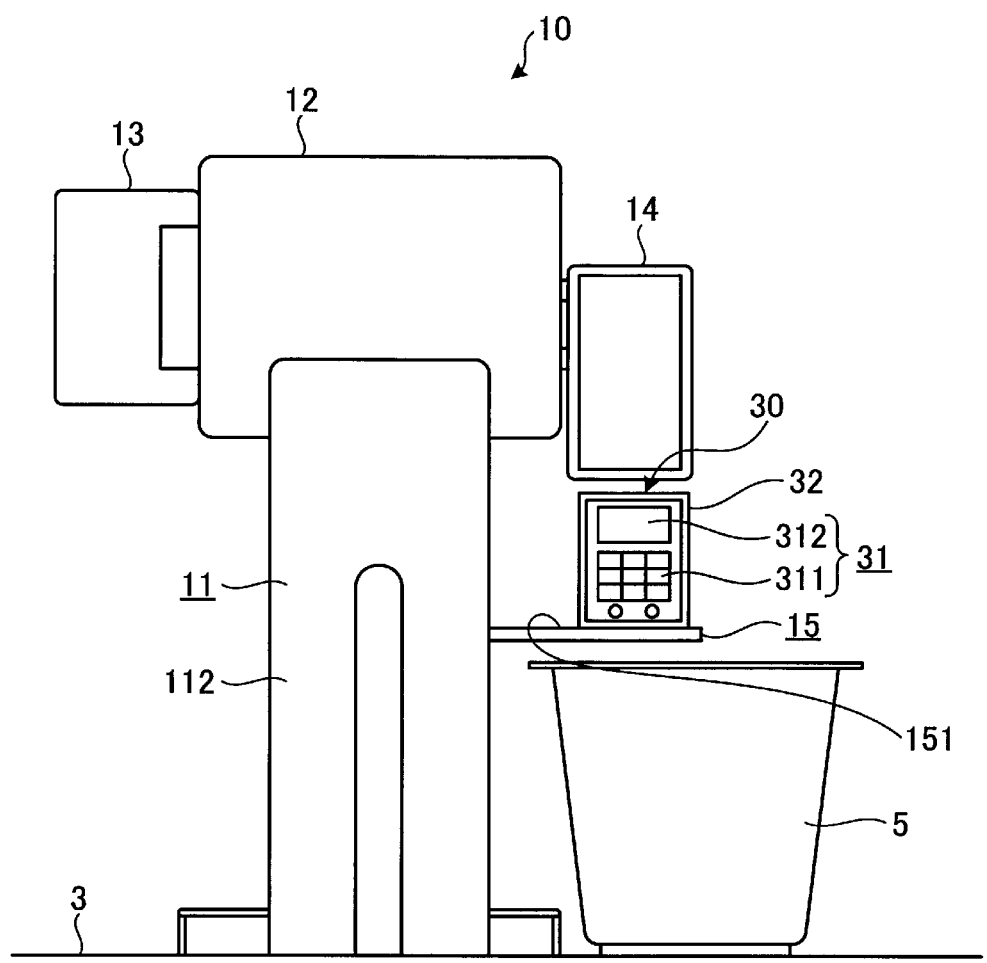
FIG. 5 is a rear view of a sales-data processing apparatus depicting a state in which a shopping basket is to one side of the main body section.

FIG. 3 is a front view of the sales-data processing apparatus 10. FIGS. 4 and 5 are rear views of the sales-data processing apparatus 10. FIGS. 3 and 4 are views illustrating a state in which a shopping basket 5 is located in front of the main body section 11. FIG. 5 is a view illustrating a state in which the shopping basket 5 is present on a side of the main body section 11.

Height for the attachment of the arm section 15 to the support section 112 may be any height. However, it is desirable to attach the arm section 15 in a position higher than the height of a shopping basket 5 such that the shopping basket 5 can be inserted between the loading surface 3 and the arm section 15. If the PIN pad device 30 and the loading surface 3 are located a predetermined interval (greater than the height of the shopping basket 5) apart from each other, it is possible to prevent the shopping basket 5 including commodities to be registered from hitting the arm section 15 and the PIN pad device 30 and the PIN pad device 30 from being broken. The operator who performs sales registration can move the shopping basket 5 on the loading surface 3 without hitting the arm section 15 and the PIN pad device 30. Therefore, it is possible to achieve efficiency of work related to the sales registration.

In the sales-data processing apparatus 10, since the PIN pad device 30 is placed on the placement surface 151 of the arm section 15, the PIN pad device 30 is separated from the loading surface 3. Therefore, in the checkout system 1 the PIN pad device 30 is not placed on the loading surface 3, the substantially all of loading surface 3 can be used for items loading/registration.

Since the PIN pad device 30 is located directly under the customer display section 14, the customer can operate the operation section 311 while both viewing the customer display section 14 and the display section 312.

In this embodiment, the arm section 15 that supports the PIN pad device 30 is provided between the customer display section 14 and the loading surface 3. The PIN pad device 30 is located below the customer display section 14. However, in other examples, disposition of the PIN pad device 30 is not limited to this example. The PIN pad device 30 may, in general, be disposed anywhere proximate to the customer display section 14 to permit the customer to operate the operation section 311 while viewing both the customer display section 14 and the display section 312. That is, the PIN pad device 30 may be located, for example, above or on a side of the customer display section 14. If the PIN pad device 30 is to be disposed proximate to the customer display section 14, then a member for supporting (a supporting section) equivalent to the arm section 15 may be attached to, for example, the customer display section 14 rather than the main body section 11.

The customer display section 14 in this embodiment is adjacent to the display section 12. However, in other examples, the customer display section 14 may be located in other positions. For example, the customer display section 14 may be located above or on the back side of the display section 12.

While certain embodiments have been described, these embodiments have been presented by way of example only, and are not intended to limit the scope of the present disclosure. Indeed, the novel embodiments described herein may be embodied in a variety of other forms; furthermore, various omissions, substitutions, and changes in the form of the embodiments described herein may be made without departing from the spirit of the present disclosure. The accompanying claims and their equivalents are intended to cover such forms or modifications as would fall within the scope and spirit of the present disclosure.

What is claimed is:

1. A sales-data processing apparatus, comprising:
   a main body section of a columnar shape extending in a vertical direction;
   a reader within the main body section and configured to read information for identifying a commodity in a sales transaction via a window in the main body section;
   an operator display attached to an upper end portion of the main body section and directed to an operator side of the main body section;
   a customer display adjacent to the operator display section and directed to a customer side of the main body section; and
   a supporting section attached to a side surface of the main body section and extending outwardly from the main body section in a horizontal direction, the supporting section being configured to support an input device at a position above a lower end portion of the main body section but below the upper end portion of the main body section, the input device being substantially adjacent to the customer display when supported by the supporting section.

2. The sales-data processing according to claim 1, wherein the position of the input device is directly below the customer display and a display of the input device faces the customer side of the main body section.

3. The sales-data processing apparatus according to claim 1, wherein the supporting section is above an upper surface of a checkout counter to which the main body section is attached.

4. The sales-data processing apparatus according to claim 1, wherein the supporting section is a shelf.

5. The sales-data processing apparatus according to claim 1, wherein the main body section is mounted to a checkout counter having an upper surface.

6. The sales-data processing apparatus according to claim 5, wherein the supporting section is a shelf attached to the side surface of the main body section with screws.

7. The sales-data processing apparatus according to claim 5, wherein
   the supporting section comprises a shelf attached to a side surface of the main body section,
   the input device comprises a keypad for inputting a personal identification number,
   the input device is directly below the customer display and between the upper surface of the checkout counter and the customer display, and
   a distance between a lowermost portion of the shelf and the upper surface of the checkout counter is greater than a height of a shopping basket for the customer.

8. The sales-data processing apparatus according to claim 1, wherein the supporting section is a shelf attached to a side surface of the main body section with screws.

9. The sales-data processing apparatus according to claim 1, wherein the input device comprises a keypad for inputting a personal identification number.

10. The sales-data processing apparatus according to claim 9, wherein the input device further comprises a screen displaying inputs from the keypad.

11. The sales-data processing apparatus according to claim 1, wherein
the operator display is above the main body section in the vertical direction, and
the customer display is attached to a side of the operator display.

12. The sales-data processing apparatus according to claim 11, further comprising:
an operation section attached to another side of the operator display opposite from side to which the customer display is attached, the operation section including a keypad and a magnetic card reader.

13. The sales-data processing apparatus according to claim 1, further comprising:
a checkout counter having an upper surface to which the main body is attached, wherein
the customer display and the input device are on a downstream side of main body with a respect to a standard customer movement direction in the sales transaction.

14. A checkout apparatus, comprising:
a checkout counter having an upper surface;
a main body section of a columnar shape and attached to the checkout counter and extending in a vertical direction away from the checkout counter;
a reader within the main body section and configured to read information for identifying a commodity in a sales transaction;
an operator display mounted to an upper end of the main body section and directed to an operator side of the checkout counter;
a customer display adjacent to the operator display section and directed to a customer side of the checkout counter;
a supporting section attached to a side surface of the main body section and extending outwardly from the main body section in a horizontal direction; and
an input device supported by the supporting section and configured to receive input operations from a customer in the sales transaction on the customer side of the checkout counter, wherein
the supporting section is configured to support the input device to be at a position that is substantially adjacent to the customer display and above the upper surface of the checkout counter.

15. The checkout apparatus according to claim 14, wherein the supporting section is a shelf on which the input device is disposed.

16. The checkout apparatus according to claim 14, wherein the input device is directly below the customer display and between the customer display and the upper surface of the checkout counter.

17. The checkout apparatus according to claim 14, wherein
the customer display is attached to a side of the operator display, and
the input device is directly below the customer display and between the customer display and the upper surface of the checkout counter.

18. The checkout apparatus according to claim 17, wherein
the supporting section is a shelf on which the input device is disposed, and
a distance between the upper surface of the checkout counter and a lower surface the shelf is greater than a height of a shopping basket for the customer when placed on the upper surface of the checkout counter.

19. The checkout apparatus according to claim 14, further comprising:
a printer within the main body section, wherein a paper discharge port of the printer is on an outer surface of the main body section.

20. The checkout apparatus according to claim 14, further comprising:
an operation section mounted on a first side of the operator display section, the operation section including a keypad and a magnetic card reader, wherein
the customer display section is adjacent to a second side of the operator display section, the first and second sides being opposite sides from one another in the horizontal direction.

* * * * *